United States Patent
Tanabe et al.

(10) Patent No.: US 12,434,264 B2
(45) Date of Patent: Oct. 7, 2025

(54) METHOD FOR FORMING SILICA-BASED MULTILAYER COATING ON SUBSTRATE FROM POLYSILAZANE-CONTAINING COMPOSITIONS

(71) Applicant: TOCALO CO., LTD., Hyogo (JP)

(72) Inventors: Takaomi Tanabe, Hyogo (JP);
Seiichiro Kawachi, Hyogo (JP);
Kosaku Hiyama, Hyogo (JP)

(73) Assignee: TOCALO CO., LTD., Hyogo (JP)

( * ) Notice: Subject to any disclaimer, the term of this patent is extended or adjusted under 35 U.S.C. 154(b) by 14 days.

(21) Appl. No.: 18/269,082

(22) PCT Filed: Nov. 11, 2021

(86) PCT No.: PCT/JP2021/041604
§ 371 (c)(1),
(2) Date: Jun. 22, 2023

(87) PCT Pub. No.: WO2022/137873
PCT Pub. Date: Jun. 30, 2022

(65) Prior Publication Data
US 2024/0116076 A1    Apr. 11, 2024

(30) Foreign Application Priority Data

Dec. 23, 2020 (JP) ................................ 2020-213363

(51) Int. Cl.
*B05D 1/38* (2006.01)
*B05D 3/02* (2006.01)
*B05D 7/00* (2006.01)
*B05D 7/14* (2006.01)

(52) U.S. Cl.
CPC ............. *B05D 1/38* (2013.01); *B05D 3/0209* (2013.01); *B05D 7/14* (2013.01); *B05D 7/54* (2013.01); *B05D 2202/15* (2013.01); *B05D 2518/12* (2013.01)

(58) Field of Classification Search
CPC ... B05D 7/14; B05D 7/52; B05D 7/54; B05D 7/546; B05D 2518/10; B05D 2518/20
USPC ...................................... 528/1–43
See application file for complete search history.

(56) References Cited

U.S. PATENT DOCUMENTS

| | | | |
|---|---|---|---|
| 5,922,411 A | 7/1999 | Shimizu et al. | |
| 8,247,037 B2* | 8/2012 | Brand | C23C 18/1241 427/388.5 |
| 9,793,109 B2* | 10/2017 | Okamura | C01B 21/087 |
| 2002/0034885 A1* | 3/2002 | Shindo | C23C 18/1279 438/789 |
| 2003/0049462 A1 | 3/2003 | Oguri et al. | |
| 2006/0003596 A1* | 1/2006 | Fucsko | H01L 21/76826 438/758 |
| 2008/0090988 A1* | 4/2008 | Nakazawa | H01L 21/3125 528/31 |
| 2010/0166977 A1 | 7/2010 | Brand et al. | |
| 2014/0308513 A1* | 10/2014 | Miura | B05D 3/0218 427/318 |
| 2015/0209826 A1* | 7/2015 | Bordia | C23C 18/1208 427/377 |
| 2023/0235126 A1* | 7/2023 | Lillebo | C08K 3/20 528/37 |

FOREIGN PATENT DOCUMENTS

| | | |
|---|---|---|
| JP | 10-194753 A | 7/1998 |
| JP | 2001-89126 A | 4/2001 |
| JP | 2001181861 A | 7/2001 |
| JP | 2002105676 A | 4/2002 |
| JP | 2003-118030 A | 4/2003 |
| JP | 2003112692 A | 4/2003 |
| JP | 2006347827 A | 12/2006 |
| JP | 2009-255040 A | 11/2009 |
| JP | 2012-116960 A | 6/2012 |

OTHER PUBLICATIONS

Blankenburg et al., "Perhydropolysilazane derived silica for flexible transparent barrier foils using a reel-to-reel wet coating technique: Single- and multilayer structures," Surface & Coatings Technology 275 (2015) 193-206. (Year: 2015).*
And Niizeki et al., "Structural Study of Silica Coating Thin Layers Prepared from Perhydropolysilazane: Substrate Dependence and Water Penetration Structure," Coatings 2016, 6, 64. (Year: 2016).*
English translation of the ISR issued for PCT/JP2021/041588 dated Jan. 18, 2022 (pp. 1-2).
English translation of the ISR issued for PCT/JP2021/041604 dated Jan. 25, 2022 (pp. 1-2).

* cited by examiner

*Primary Examiner* — William P Fletcher, III
(74) *Attorney, Agent, or Firm* — Ross J. Christie; Millen, White, Zelano & Branigan, P.C.

(57) ABSTRACT

The method for forming a coating of the present invention includes: a first step of applying a first solution containing a polysilazane to a surface of a metal substrate and heating the first solution to form a first coating on the surface of the metal substrate, and a second step of applying a second solution containing a polysilazane to a surface of the first coating and heating the second solution at a temperature lower than a heating temperature in the first step to form a second coating on the surface of the first coating, wherein a density of the first coating is less than 2.00 g/cm³, and a density of the second coating is 2.00 g/cm³ or more.

5 Claims, 5 Drawing Sheets

METHOD FOR FORMING SILICA-BASED MULTILAYER COATING ON SUBSTRATE FROM POLYSILAZANE-CONTAINING COMPOSITIONS

TECHNICAL FIELD

The present invention relates to a method for forming a coating having corrosion resistance.

BACKGROUND ART

Some constituent members of devices for manufacturing semiconductors, flat panel displays, etc. or devices similar thereto are exposed to corrosive gas or plasma of corrosive gas.

These constituent members are usually formed using a metallic material such as an aluminum alloy or stainless steel, but the metallic material such as an aluminum alloy or stainless steel has low corrosion resistance to a halogen-based corrosive gas or plasma thereof. So, in order to impart corrosion resistance to these members, for example, coating with a silica-based coating using perhydropolysilazane may be applied. The silica-based coating is very dense, and has high corrosion resistance against halogen-based corrosive gases and plasma. Therefore, by forming a silica-based coating on a surface of the constituent member, the surface of the constituent member can be blocked from the external environment, and corrosion of the constituent member can be inhibited.

Incidentally, silica-based coatings formed using perhydropolysilazane are dense but are fragile and are extremely small in coefficient of linear expansion as compared with metal materials. For this reason, there is a problem that cracks are generated in a coating in the process of forming the coating, and constituent members cannot be sufficiently covered when a thin coating is formed in order to inhibit the generation of the cracks, and when the effect of blocking the constituent members from the external environment is reduced, the anticorrosion effect for the constituent members is reduced.

In order to solve such a problem, Patent Literature 1 discloses forming a silica-based coating using a solution comprising perhydropolysilazane and a polyorganosilazane.

In Patent Literature 1, through making the solution contain a polyorganosilazane, a coating more flexible than a silica-based coating formed using only perhydropolysilazane is formed, and occurrence of cracks in the coating is prevented (See, for example, Patent Literature 1).

CITATION LIST

Patent Literature

PATENT LITERATURE 1: Japanese Laid-Open Patent Application No. 2002-105676

SUMMARY OF THE INVENTION

Technical Problem

In Cited Literature 1, since a heat treatment temperature after applying the solution is set to a relatively low temperature (around 300° C.), the coating contains, in addition to silica, etc. obtained through conversion into silica, an unconverted substance. The inclusion of the unconverted substance in the coating contributes to the flexibility of the coating, but decreases the denseness of the coating, so that a sufficiently dense silica-based coating cannot be obtained. In addition, since the heat treatment temperature is 300° C., it is difficult to obtain a coating having sufficient corrosion resistance from a material having a large coefficient of linear expansion, particularly an aluminum alloy.

As described above, with the silica-based coating described in Cited Literature 1, generation of cracks in the coating can be prevented, but a sufficiently dense coating cannot be obtained, and the silica-based coating may be poor in corrosion resistance.

Solution to Problem (1) The method for forming a coating according to the present invention comprises:

a first step of applying a first solution comprising a polysilazane to a surface of a metal substrate and heating the first solution to form a first coating on the surface of the metal substrate, and a second step of applying a second solution comprising a polysilazane to a surface of the first coating and heating the second solution at a temperature lower than a heating temperature in the first step to form a second coating on the surface of the first coating, wherein a density of the first coating is less than 2.00 g/cm$^3$, and a density of the second coating is 2.00 g/cm$^3$ or more.

According to the method for forming a coating having the above configuration, the density of the second coating is 2.00 g/cm$^3$ or more, and the second coating is obtained as a dense coating sufficiently converted into silica. On the other hand, the density of the first coating is less than 2.00 g/cm$^3$, and the first coating contains an unconverted substance in addition to silica. When the first coating contains an unconverted substance, flexibility can be imparted to the first coating.

Further, in the second step, since the first coating is heated at a temperature lower than the heating temperature in the first step, the first coating is not heated at a temperature higher than that in the first step by the heating in the second step.

As a result, it is possible to inhibit the conversion into silica of an unconverted substance of the first coating due to heating of the first coating and progress of densification of the first coating accompanying the conversion into silica, so that the flexibility of the first coating can be maintained.

As described above, since the second coating is formed on the surface of the first coating having flexibility, even if the second coating is formed as a sufficiently dense coating, the stress acting on the second coating is relieved due to the difference in coefficient of linear expansion between the second coating and the metal substrate, and generation of cracks on the surface of the second coating can be prevented.

As a result, it is possible to obtain a sufficiently dense coating while preventing decrease in the anticorrosion effect caused by cracks, and a coating having high corrosion resistance can be formed.

(2) In the method for forming a coating, the second solution preferably contains at least one among an organic metal, a metal compound, and an amine compound.

The organic metal, the metal compound, and the amine compound are catalysts for lowering the silica conversion temperature of the polysilazane, and when the first solution and the second solution contain these compounds, the silica conversion temperature of the polysilazane can be lowered, and conversion into silica can be carried out even at further lower temperature.

(3) A silica-based coating formed using a solution containing a polyorganosilazane contains organic silica having an organic component such as a methyl group. When a silica-based coating containing such organic silica is exposed to a halogen-based gas, an organic portion is selectively corroded, so that corrosion resistance may be poor.

Therefore, in the method for forming a coating, the polysilazane contained in the second solution is preferably perhydropolysilazane.

More preferably, both the polysilazane contained in the first solution and the polysilazane contained in the second solution are perhydropolysilazane.

In this case, as compared with the case of a polysilazane having an organic group such as polyorganosilazane, a dense coating can be obtained and a coating having higher corrosion resistance can be formed.

(4) In the method for forming a coating, the thickness of each of the first coating and the second coating is preferably 0.01 μm or more and 10.0 μm or less. The thickness is more preferably 0.05 μm or more and 5.0 μm or less.

When the thickness of the first coating is less than 0.05 μm, there is a possibility that the stress acting on the second coating cannot be sufficiently relieved. When the thickness of the first coating exceeds 5.0 μm, the entire coating including the first coating and the second coating may be weakened. Through setting the thickness of the first coating to 0.05 μm or more and 5.0 μm or less, a coating capable of appropriately relieving the stress acting on the second coating can be obtained.

In addition, when the thickness of the second coating is less than 0.05 μm, the surface of the first coating may not be sufficiently shielded from the external environment.

When the thickness of the second coating exceeds 5.0 μm, peeling of the coating, breakage of the coating, and the like may occur due to internal stress of the second coating itself.

Through setting the thickness of the second coating to 0.05 μm or more and 5.0 μm or less, a coating capable of appropriately shielding the surface of the metal substrate from the external environment can be obtained.

(5) In the method for forming a coating, the first step may be a step in which the first coating is formed by repeating a prescribed number of times a step of applying the first solution to the metal substrate and a step of heating the first solution.

In this case, the thickness of the first coating can be increased, and the surface of the metal substrate can be sufficiently covered.

(6) In the method for forming a coating, the second step may be a step in which the second coating is formed by repeating a prescribed number of times a step of applying the second solution to the first coating and a step of heating the second solution at a temperature lower than the heating temperature in the first step.

In this case, the surface of the first coating that has flexibility and has not been sufficiently converted into silica can be sufficiently covered with the second coating.

Advantageous Effects of the Invention

According to the present invention, a coating having high corrosion resistance can be formed.

DETAILED DESCRIPTION

Hereinafter, the method for forming a coating according to an embodiment of the present invention will be described.

The method for forming a coating according to the present embodiment is a method for forming a silica-based coating using a polysilazane.

The silica-based coating to be obtained in the present embodiment is formed on a constituent member of a chamber, a pipe or the like to be exposed to a halogen-based corrosive gas or plasma of a corrosive gas, in an etching apparatus to be used for the manufacture of a semiconductor or a flat panel display or in an apparatus for the formation of a film such as CVD or PVD.

The method for forming a coating according to the present embodiment comprises a first step of applying a first solution comprising a polysilazane to a surface of a metal substrate and heating the first solution to form a first coating on the surface of the metal substrate, and a second step of applying a second solution comprising a polysilazane to a surface of the first coating and heating the second solution at a temperature lower than a heating temperature in the first step to form a second coating on the surface of the first coating. The density of the first coating is less than 2.00 g/cm$^3$, and the density of the second coating is 2.00 g/cm$^3$ or more.

Each step will be described below.

(1) First Step (1-1) Application of First Solution

In the first step, the first solution is applied to the surface of the metal substrate as described above.

The first solution is a polysilazane-containing solution obtained by dissolving a polysilazane in an organic solvent.

As the polysilazane, perhydropolysilazane, polymethylhydrosilazane, poly (N-methylsilazane), poly N-(triethylsilyl)allylsilazane, poly N-(dimethylamino)cyclohexylsilazane, phenylpolysilazane, and the like can be used as a chain polysilazane. Among these, perhydropolysilazane having an average molecular weight of 300 to 5000 is particularly preferable.

Examples of the organic solvent include ethers (e.g., ethyl ether, isopropyl ether, ethyl butyl ether, dibutyl ether, 1,2-dioxyethane, dioxane, dimethyldioxane, tetrahydrofuran, and tetrahydropyran) and hydrocarbons (e.g., pentane, hexane, isohexane, methylpentane, heptane, isoheptane, octane, isooctane, cyclopentane, methylcyclopentane, cyclohexane, methylcyclohexane, benzene, toluene, xylene, and ethylbenzene). One or a mixture of two or more of these ethers and hydrocarbons may be used as the organic solvent.

The concentration of the polysilazane contained in the first solution is preferably 0.05% by mass or more and 40% by mass or less. When the concentration of the polysilazane is less than 0.05% by mass, there is a possibility that a first coating having a sufficient thickness cannot be obtained. When the concentration of the polysilazane exceeds 40% by mass, the viscosity of the first solution is high, and the thickness of the first coating may be uneven. The concentration of the polysilazane contained in the first solution is more preferably 1% by mass or more and 25% by mass or less.

The first solution may contain a catalyst in addition to the polysilazane. The catalyst has an effect of relatively lowering the temperature at which the polysilazane is converted into silica or increasing the silica conversion rate.

Examples of the catalyst include a metal catalyst (organic metal or metal compound) and an amine-based catalyst (amine compound).

Examples of the metal catalyst include an organic metal or metal compound comprising at least one metal selected from among nickel, titanium, platinum, rhodium, cobalt, iron, ruthenium, osmium, palladium, iridium, and aluminum. In particular, metal carboxylates are preferable from the viewpoint of solubility in the polysilazane-containing solution, stability, and reactivity.

Examples of the amine-based catalyst include amine compounds such as monoamines, diamines, triamines, tetraamines, chain amine residue-containing hydroxyl compounds, and cyclic amine residue-containing hydroxyl compounds.

The amine residue-containing hydroxyl compound reacts with a polysilazane to be converted into an amine residue-containing polysilazane.

When the first solution contains a catalyst (at least one among an organic metal, a metal compound, and an amine compound), the weight ratio of (the total amount of) the catalyst to the polysilazane is preferably 0.0001 or more and 1 or less. When the weight ratio of the catalyst to the polysilazane is less than 0.0001, the effect as a catalyst may not be sufficiently obtained. When the weight ratio of the catalyst to the polysilazane exceeds 1, thickening (gelation) of the first solution is remarkable, and the thickness of the first coating may be uneven. The weight ratio of the catalyst to the polysilazane is more preferably 0.001 or more and 0.2 or less. Through setting the weight ratio of the catalyst to the polysilazane to 0.2 or less, the thickening of the first solution can be effectively inhibited.

Here, the conditions under which the polysilazanes contained in the first solution and the second solution are converted into silica (silica conversion conditions) include such parameters as a heating temperature, a heating time, a heating atmosphere, presence or absence of the catalyst, and the type of the catalyst.

The heating temperature (silica conversion temperature) is determined according to the presence or absence of the catalyst, the type of the catalyst, the heating time, and the heating atmosphere, which are other parameters included in the silica conversion conditions.

In the following description, the silica conversion condition of the polysilazane in the first solution is also referred to as a first silica conversion condition, and the silica conversion temperature of the polysilazane in the first solution is also referred to as a first silica conversion temperature. The silica conversion condition of the polysilazane in the second solution is also referred to as a second silica conversion condition, and the silica conversion temperature of the polysilazane in the second solution is also referred to as a second silica conversion temperature.

When the first solution does not contain a catalyst, the first silica conversion temperature is, for example, 300° C. to 550° C.

When the first solution contains a metal catalyst, the first silica conversion temperature is, for example, 120° C. to 350° C.

When the first solution contains an amine-based catalyst, the first silica conversion temperature is, for example, room temperature to 250° C.

The first silica conversion condition including the first silica conversion temperature can be determined by measuring the first solution by the method described below.

The measurement of the first silica conversion condition is carried out by forming a coating on a silicon wafer using the first solution.

First, the weight of the silicon wafer is measured with an electronic balance or the like. The first solution is applied to the silicon wafer by a spin coating method, then the silicon wafer is heated at a prescribed heating temperature for a prescribed heating time in the air to form a silica-based coating, and then the silicon wafer having the silica-based coating formed thereon is weighed. Next, a difference in the weight of the silicon wafer between before and after the formation of the silica-based coating is determined, and this value is defined as the weight of the coating. Next, the thickness of a coating is measured using a known method, and preferably, a more accurate thickness is obtained by measuring from a cross section of the coating with an FE-SEM device or the like. Using the weight and thickness determined for the coating, the density of the coating is calculated in accordance with the formula shown below.

In the method described above, a plurality of combinations of the heating temperature and the heating time are set, and the density of a coating is obtained for each combination. Among the combinations, a combination which affords a density of a coating of 2.0 g/cm$^3$ or more is set as the first silica conversion condition.

Density of coating [g/cm$^3$]=weight of coating [g]/
(thickness of coating [μm]×surface area of silicon wafer [cm2]×0.0001)

A silica-based coating obtained by heating a polysilazane under a condition that does not satisfy the silica conversion condition (i.e., heating at a temperature lower than the silica conversion temperature or for a time shorter than the heating time of the silica conversion condition) is not a dense siliceous film due to containing an unconverted substance. The unconverted substance is an intermediate until the conversion from the polysilazane to silica.

The silica-based coating obtained by heating the first solution under the first silica conversion condition contains no unconverted substance. That is, the first silica conversion condition indicates a heating condition under which the polysilazane contained in the first solution is completely converted into silica to afford a sufficiently dense siliceous coating.

Examples of the metal substrate to which the first solution is applied include an etching apparatus and a chamber, piping, or the like of an apparatus for forming a coating as described above. Such a chamber and pipe are formed of stainless steel or an aluminum alloy.

A surface of the metal substrate formed of stainless steel or an aluminum alloy is cleaned and degreased. Thereafter, the first solution is applied to the surface of the metal substrate.

As a pretreatment for applying the first solution, the surface of the metal substrate may be modified by a known method such a UV lamp, an excimer lamp, or irradiation with plasma.

The first solution is applied using a known application method such as a spin coating method, a roll coating method, a flow coating method, a spray coating method, or a dip coating method.

(1-2) Formation of First Coating

Furthermore, in the first step, the first solution applied to the metal substrate is heated in the air or in an atmosphere containing water vapor to convert part of the polysilazane contained in the first solution into silica and form a first coating. The first coating is a silica-based coating (inorganic siliceous coating) obtained through the conversion into silica of part of the polysilazane contained in the first solution. The first solution applied to the metal substrate is heated under a condition that does not satisfy a prescribed first silica conversion condition.

The heating temperature in the first step is set to a temperature lower than the first silica conversion temperature under a prescribed first silica conversion condition. For example, in a case where the prescribed first silica conversion condition is a heating time of 1 hour and a first silica conversion temperature T (T is a certain value), when the heating time of the first step is set to 1 hour, the heating temperature in the first step is set to a temperature lower than the first silica conversion temperature T.

The first coating obtained by heating the polysilazane of the first solution contains an unconverted substance in addition to silica.

When the heating temperature in the first step is equal to or higher than the first silica conversion temperature, the conversion into silica of the polysilazane in the first solution sufficiently proceeds, and as a result, there is a possibility that the first coating is densified and flexibility cannot be secured.

Through setting the heating temperature in the second step to a temperature lower than the first silica conversion temperature, the progress of the conversion into silica of the polysilazane in the first solution is inhibited, and the amount of the unconverted substances contained in the first coating can be maintained relatively large. As a result, the proportion of the unconverted substance in the first coating can be appropriately maintained, and as a result, the densification of the first coating is inhibited and flexibility can be imparted to the first coating.

The density of the first coating is less than 2.00 g/cm$^3$. This means that the first coating contains an unconverted substance and has not been completely converted into silica.

The heating temperature in the first step is preferably equal to or higher than the boiling point of the organic solvent. The heating in the first step is carried out in order to react part of the polysilazane in the first solution, thereby converting the polysilazane into silica and also to remove the organic solvent in the first solution. Therefore, when the heating temperature in the first step is lower than the boiling point of the organic solvent, the organic solvent in the first solution may not be effectively removed. Through setting the heating temperature in the first step to be equal to or higher than the boiling point of the organic solvent, the organic solvent in the first solution can be effectively removed.

The heating time in the first step needs to be set such that the conversion into silica of the polysilazane in the first solution is inhibited so as not to sufficiently proceed but the reaction is advanced to some extent and a coating is formed on the metal substrate. The heating time is, for example, preferably 0.5 hours or more and 5 hours or less. If the heating time is shorter than 0.5 hours, there is a possibility that the reaction of the perhydropolysilazane in the first solution is insufficient, leading to insufficient adhesion between the metal substrate and the first coating. When the heating time exceeds 5 hours, the conversion into silica of the polysilazane excessively proceeds, and there is a possibility that the flexibility of the first coating cannot be secured.

In the first step, the first coating may be formed by repeating the step of applying the first solution and the step of heating the first solution a prescribed number of times. In this case, the thickness of the first coating can be increased, and the surface of the metal substrate can be sufficiently covered.

(2) Second Step (2-1) Application of Second Solution

In the second step, the second solution is applied to a surface of the first coating.

The second solution is a polysilazane-containing solution obtained by dissolving a polysilazane in an organic solvent.

As the polysilazane, perhydropolysilazane, polymethylhydrosilazane, poly (N-methylsilazane), poly N-(triethylsilyl)allylsilazane, poly N-(dimethylamino)cyclohexylsilazane, phenylpolysilazane, and the like can be used as a chain polysilazane. Among these, perhydropolysilazane having an average molecular weight of 300 to 5000 is particularly preferable.

As the organic solvent, an organic solvent the same as that of the first solution can be employed and examples thereof include ethers (e.g., ethyl ether, isopropyl ether, ethyl butyl ether, dibutyl ether, 1,2-dioxyethane, dioxane, dimethyldioxane, tetrahydrofuran, and tetrahydropyran) and hydrocarbons (e.g., pentane, hexane, isohexane, methylpentane, heptane, isoheptane, octane, isooctane, cyclopentane, methylcyclopentane, cyclohexane, methylcyclohexane, benzene, toluene, xylene, and ethylbenzene). One or a mixture of two or more of these ethers and hydrocarbons may be used as the organic solvent.

The concentration of the polysilazane contained in the second solution is preferably 0.05% by mass or more and 40% by mass or less. When the concentration of the polysilazane is less than 0.05% by mass, there is a possibility that a second coating having the minimum required thickness cannot be obtained. When the concentration of the polysilazane exceeds 40% by mass, the viscosity of the second solution is high, and the thickness of the second coating may be uneven. The concentration of the polysilazane contained is more preferably 1% by mass or more and 25% by mass or less.

The second solution preferably contains a catalyst in addition to the polysilazane. When the second solution contains a catalyst, the heating temperature in the second step can be easily set to a temperature lower than the heating temperature under the silica conversion condition in the first step.

As the catalyst, a catalyst the same as that of the first solution can be employed and examples thereof include a metal catalyst (organic metal or metal compound) and an amine-based catalyst (amine compound).

Examples of the metal catalyst include an organic metal or metal compound comprising at least one metal selected from among nickel, titanium, platinum, rhodium, cobalt, iron, ruthenium, osmium, palladium, iridium, and aluminum. In particular, metal carboxylates are preferable from the viewpoint of solubility in the polysilazane-containing solution, stability, and reactivity.

Examples of the amine-based catalyst include amine compounds such as monoamines, diamines, triamines, tetraamines, chain amine residue-containing hydroxyl compounds, and cyclic amine residue-containing hydroxyl compounds.

When the second solution contains a catalyst (at least one among an organic metal, a metal compound, and an amine compound), the weight ratio of (the total amount of) the catalyst to the polysilazane is preferably 0.0001 or more and 1 or less. When the weight ratio of the catalyst to the polysilazane is less than 0.0001, the effect as a catalyst may not be sufficiently obtained. When the weight ratio of the catalyst to the polysilazane exceeds 1, thickening (gelation) of the second solution is remarkable, and the thickness of the coating may be uneven. The weight ratio of the catalyst to the polysilazane is more preferably 0.001 or more and 0.2 or less. Through setting the weight ratio of the catalyst to the polysilazane to 0.2 or less, the thickening of the second solution can be effectively inhibited.

When the second solution does not contain a catalyst, the second silica conversion temperature is, for example, 300° C. to 550° C.

When the second solution contains a metal catalyst, the second silica conversion temperature is, for example, 120° C. to 350° C.

When the second solution contains an amine-based catalyst, the second silica conversion temperature is, for example, room temperature to 250° C.

The silica conversion condition including the second silica conversion temperature can be determined through measurement for the second solution by the same method as the method for measuring the first silica conversion condition.

In the present embodiment, the second silica conversion condition is a condition including a second silica conversion temperature of a value lower than the first silica conversion temperature included in the prescribed first silica conversion condition.

The second solution is applied using a known application method such as a spin coating method, a roll coating method, a flow coating method, a spray coating method, or a dip coating method.

(2-2) Formation of Second Coating

Furthermore, in the second step, the second solution applied to the surface of the first coating is heated in the air or in an atmosphere containing water vapor to convert the polysilazane contained in the second solution into silica and form a second coating. The second coating is a silica-based coating (inorganic siliceous coating) obtained through the conversion into silica of the polysilazane contained in the second solution.

The heating temperature in the second step is set to a temperature lower than the heating temperature in the first step and equal to or higher than the second silica conversion temperature.

When the heating temperature is equal to or higher than the heating temperature in the first step, the conversion into silica of an unconverted substance of the first coating and densification of the first coating associated therewith proceed, so that the flexibility of the first coating is impaired.

On the other hand, when the heating temperature is lower than the second silica conversion temperature, the conversion into silica of the polysilazane contained in the second solution may not be sufficiently carried out.

Through setting the heating temperature to a temperature equal to or higher than the second silica conversion temperature, the progress of the conversion into silica of the polysilazane contained in the second solution is promoted. As a result, the second coating can be formed as a coating denser than the first coating.

The density of the second coating is 2.00 g/cm$^3$ or more. This means that the second coating has been sufficiently converted into silica.

The heating time in the second step is just required to be a time for which the second solution on the first coating is sufficiently heated and the polysilazane in the second solution is converted into silica, and is preferably, for example, 0.5 hours or more and 10 hours or less. If the time is shorter than 0.5 hours, the conversion into silica of the polysilazane in the second solution may be insufficient. If the time exceeds 10 hours, time is unnecessarily consumed, resulting in an increase in cost.

In the second step, the second coating may be formed by repeating a prescribed number of times the step of applying the second solution and the step of heating the second solution at a temperature lower than the heating temperature in the first step.

In this case, the surface of the first coating that has flexibility and has not been sufficiently converted into silica can be sufficiently covered with the second coating.

Figure 1:
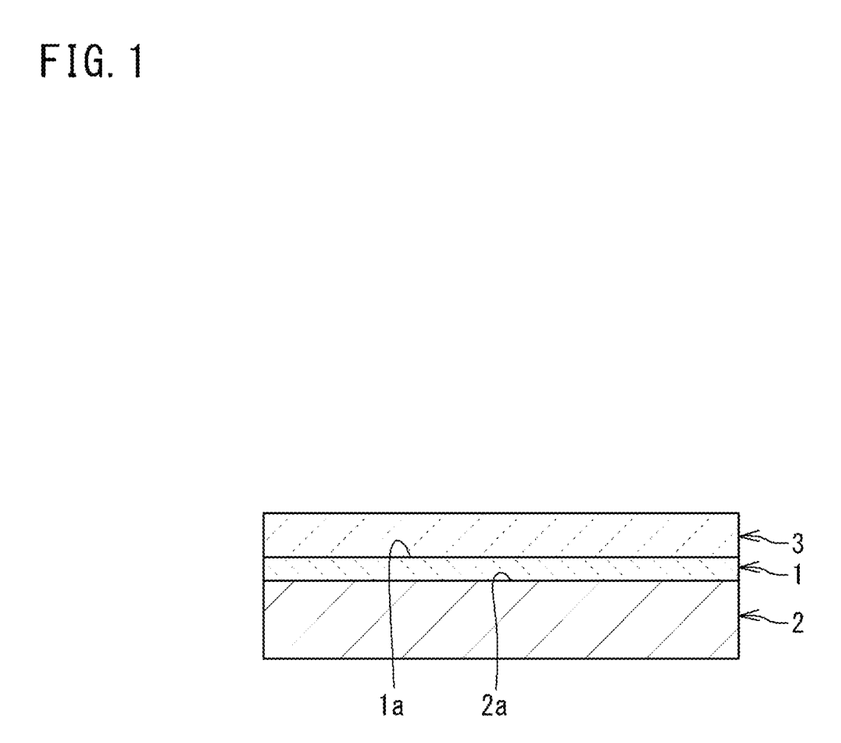
FIG. 1 is a partial cross-sectional view of a metal substrate and a coating after a second coating is formed through a second step.

FIG. 1 is a partial cross-sectional view of the metal substrate and the coating after the second coating is formed through the second step.

In FIG. 1, the first coating 1 is formed on the surface 2a of the metal substrate 2.

The second coating 3 is formed on the surface 1a of the first coating 1.

The first coating 1 is a product resulting from the conversion into silica of part of the polysilazane in the first solution, and is formed mainly of silica.

As described above, since the first coating 1 contains an unconverted substance moderately, the first coating 1 is inhibited from being densified and has flexibility.

In addition, as described above, the second coating 3 is formed as a dense coating in which the polysilazane is sufficiently converted into silica.

Assuming that the second coating 3 is formed of substantially only silica, the coefficient of linear expansion of the second coating is an intermediate value between that of inorganic silica glass and that of quartz, and is about 0.6 to 6 ($\times 10^{-6}$/° C.).

On the other hand, the metal substrate 2 is stainless steel or an aluminum alloy, and as an example, JIS SUS 316L, which is stainless steel, has a coefficient of linear expansion of 16.0 ($\times 10^{-6}$/° C.), and JIS A 6061, which is an aluminum alloy, has a coefficient of linear expansion of 23.6 ($\times 10^{-6}$/° C.).

As described above, the coefficient of linear expansion of the second coating 3 is extremely small as compared with the metal substrate 2, and it is considered that a large stress acts on the second coating 3 due to the difference in coefficient of linear expansion between the second coating 3 and the metal substrate 2.

On the other hand, in the present embodiment, the second coating 3 is formed on a surface of the first coating 1 having flexibility.

As described above, the density of the second coating 3 is 2.00 g/cm$^3$ or more, and the second coating is obtained as a dense coating sufficiently converted into silica. On the other hand, the density of the first coating 1 is less than 2.00 g/cm$^3$, and the first coating contains an unconverted substance in addition to silica. When the first coating 1 contains an unconverted substance, flexibility can be imparted to the first coating.

Further, in the second step, since the first coating is heated at a temperature lower than the heating temperature in the first step, the first coating 1 is not heated at a temperature higher than that in the first step by the heating in the second step.

As a result, it is possible to inhibit the conversion into silica of an unconverted substance of the first coating 1 due to heating of the first coating 1 and progress of densification of the first coating 1 accompanying the conversion into silica, so that the flexibility of the first coating 1 can be maintained.

As described above, since the second coating 3 is formed on the surface of the first coating 1 having flexibility, even if the second coating 3 is formed as a sufficiently dense coating, the stress acting on the second coating 3 is relieved due to the difference in coefficient of linear expansion between the second coating 3 and the metal substrate 2, and generation of cracks in the second coating 3 can be prevented.

As a result, a sufficiently dense coating can be obtained, and a coating having high corrosion resistance can be formed.

In the first step and the second step, for example, it is preferable to use a solution not containing a catalyst (an organic metal, a metal compound, and an amine compound) as the first solution and a solution containing a catalyst (an organic metal, a metal compound, and an amine compound) as the second solution from the viewpoint of easily setting the second silica conversion temperature lower than the first silica conversion temperature.

As the polysilazane contained in the second solution, perhydropolysilazane is particularly preferable.

In this case, as compared with the case of a polysilazane containing an organic group such as polyorganosilazane, a dense coating can be obtained and a second coating having higher corrosion resistance can be obtained.

In the above embodiment, the thickness of the first coating is preferably 0.01 μm or more and 10.0 μm or less.

When the thickness of the first coating is less than 0.01 μm, there is a possibility that the stress acting on the second coating cannot be sufficiently relieved.

When the thickness of the first coating exceeds 10.0 μm, the entire coating including the first coating and the second coating may be weakened.

Through setting the thickness of the first coating to 0.01 μm or more and 10.0 μm or less, a coating capable of appropriately relieving the stress acting on the second coating can be obtained.

The thickness of the first coating is more preferably 0.05 μm or more and 5.0 μm or less.

In the above embodiment, the thickness of the second coating is preferably 0.05 μm or more and 10.0 μm or less.

When the thickness of the second coating is less than 0.01 μm, the surface of the first coating may not be sufficiently shielded from the external environment.

When the thickness of the second coating exceeds 10.0 μm, peeling of the coating, breakage of the coating, and the like may occur due to internal stress of the second coating itself.

Through setting the thickness of the second coating to 0.01 μm or more and 10.0 μm or less, a coating capable of appropriately shielding the surface of the metal substrate from the external environment can be obtained.

The thickness of the second coating is more preferably 0.05 μm or more and 5.0 μm or less.

EXAMPLES

Hereinafter, the present invention will be described in more detail with reference to Examples, but the present invention is not limited to the following Examples.

Example 1

As the first solution, a solution prepared to have a concentration of perhydropolysilazane of 10% by mass from a dibutyl ether solution (manufactured by Merck Performance Materials, Inc., trade name: Durazane 2200) containing no catalyst and having a concentration of perhydropolysilazane of 20% by mass was used.

As the first silica conversion condition in the first solution, a value determined by the above-described measurement method was used, and the first silica conversion temperature was determined to be 400° C. for a heating time of 1 hour.

As the second solution, a dibutyl ether solution (manufactured by Merck Performance Materials, Inc., trade name: Durazane 2400) containing a metal catalyst (palladium) and having a concentration of perhydropolysilazane of 20% by mass was used.

As the second silica conversion condition in the second solution, a value determined by the above-described measurement method was used, and the second silica conversion temperature was determined to be 150° C. for a heating time of 1 hour.

As the metal substrate, a plate of stainless steel (JIS SUS 316L) having a size of 50 mm×50 mm and a thickness of 5 mm was prepared.

The surface of the metal substrate was degreased and washed, the first solution was applied by a spin coating method, and heated for 1 hour at 250° C., which is 150° C. lower than the first silica conversion temperature included in the first silica conversion conditions. As a result, a first coating containing an unconverted substance was formed on the surface of the metal substrate.

Thereafter, the second solution was applied to the surface of the first coating by a spin coating method, and heated for 1 hour at 150° C., which is the second silica conversion temperature. As a result, a second coating was formed on the surface of the first coating, and a test piece in which the first coating (thickness: 0.7 to 0.8 μm) and the second coating (thickness: 1.5 to 1.6 μm) were formed on the metal substrate was obtained.

At this time, the density of the first coating was 1.82 g/cm$^3$, and the density of the second coating was 2.14 g/cm$^3$. The densities of these coatings were determined by measuring the densities of coatings heated under the same conditions by the above-described measurement method.

Example 2

As the first solution, a solution prepared to have a concentration of perhydropolysilazane of 10% by mass from a dibutyl ether solution (manufactured by Merck Performance Materials, Inc., trade name: Durazane 2200) containing no catalyst and having a concentration of perhydropolysilazane of 20% by mass was used.

As the first silica conversion condition in the first solution, a value determined by the above-described measurement method was used, and the first silica conversion temperature was determined to be 400° C. for a heating time of 1 hour.

As the second solution, a dibutyl ether solution (manufactured by Merck Performance Materials, Inc., trade name:

Durazane 2800) containing an amine-based catalyst and having a concentration of perhydropolysilazane of 20% by mass was used.

As the second silica conversion condition in the second solution, a value determined by the above-described measurement method was used, and the second silica conversion temperature was determined to be 130° C. for a heating time of 1 hour.

As the metal substrate, a plate of stainless steel (JIS SUS 316L) having a size of 50 mm×50 mm and a thickness of 5 mm was prepared.

The surface of the metal substrate was degreased and washed, the first solution was applied by a spin coating method, and heated for 1 hour at 250° C., which is 150° C. lower than the first silica conversion temperature included in the first silica conversion conditions. As a result, a first coating containing an unconverted substance was formed on the surface of the metal substrate.

Thereafter, the second solution was applied to the surface of the first coating by a spin coating method, and heated for 1 hour at 130° C., which is the second silica conversion temperature. As a result, a second coating was formed on the surface of the first coating, and a test piece in which the first coating (thickness: 0.8 to 0.9 μm) and the second coating (thickness: 1.5 to 1.6 μm) were formed on the metal substrate was obtained.

At this time, the density of the first coating was 1.82 g/cm$^3$, and the density of the second coating was 2.36 g/cm$^3$.

Example 3

As the first solution, a solution prepared to have a concentration of perhydropolysilazane of 10% by mass from a dibutyl ether solution (manufactured by Merck Performance Materials, Inc., trade name: Durazane 2200) containing no catalyst and having a concentration of perhydropolysilazane of 20% by mass was used.

As the first silica conversion condition in the first solution, a value determined by the above-described measurement method was used, and the first silica conversion temperature was determined to be 400° C. for a heating time of 1 hour.

As the second solution, a dibutyl ether solution (manufactured by Merck Performance Materials, Inc., trade name: Durazane 2400) containing a metal catalyst (palladium) and having a concentration of perhydropolysilazane of 20% by mass was used.

As the second silica conversion condition in the second solution, a value determined by the above-described measurement method was used, and the second silica conversion temperature was determined to be 150° C. for a heating time of 1 hour.

As the metal substrate, a plate of an aluminum alloy (JIS A 6061) having a size of 50 mm×50 mm and a thickness of 5 mm was prepared.

The surface of the metal substrate was degreased and washed, the first solution was applied by a spin coating method, and heated for 1 hour at 250° C., which is 150° C. lower than the first silica conversion temperature included in the first silica conversion conditions. As a result, a first coating containing an unconverted substance was formed on the surface of the metal substrate.

Thereafter, the second solution was applied to the surface of the first coating by a spin coating method, and heated for 1 hour at 150° C., which is the second silica conversion temperature. As a result, a second coating was formed on the surface of the first coating, and a test piece in which the first coating (thickness: 1.2 to 1.3 μm) and the second coating (thickness: 1.6 to 1.7 μm) were formed on the metal substrate was obtained.

At this time, the density of the first coating was 1.82 g/cm$^3$, and the density of the second coating was 2.14 g/cm$^3$.

Comparative Example

As the first solution, a dibutyl ether solution (manufactured by Merck Performance Materials, Inc., trade name: Durazane 2400) containing a metal catalyst (palladium) and having a concentration of perhydropolysilazane of 20% by mass was used. As the first silica conversion condition in the first solution, the first silica conversion temperature was determined to be 250° C. for a heating time of 1 hour on the basis of the data disclosed by the manufacturer.

As the metal substrate, a plate of stainless steel (JIS SUS 316L) having a size of 50 mm×50 mm and a thickness of 5 mm was prepared.

A surface of the metal substrate was degreased and washed, the first solution was applied thereto by a spin coating method, and heated for 1 hour at 250° C., which is the first silica conversion temperature. As a result, a test piece in which a silica-based coating (thickness: 1.2 to 1.3 μm) was formed on the metal substrate was obtained.

[Observation of Cross Section of Coating]

Each of the test pieces obtained in Examples 1 to 3 and Comparative Example was cut with a high-speed cutter, and the obtained cut piece was embedded in a resin, subjected to ion milling (IM400 manufactured by Hitachi High-Tech Corporation), and a cross section of the coating was observed using an FE-SEM (SU8020 manufactured by Hitachi High-Tech Corporation).

Figure 2:
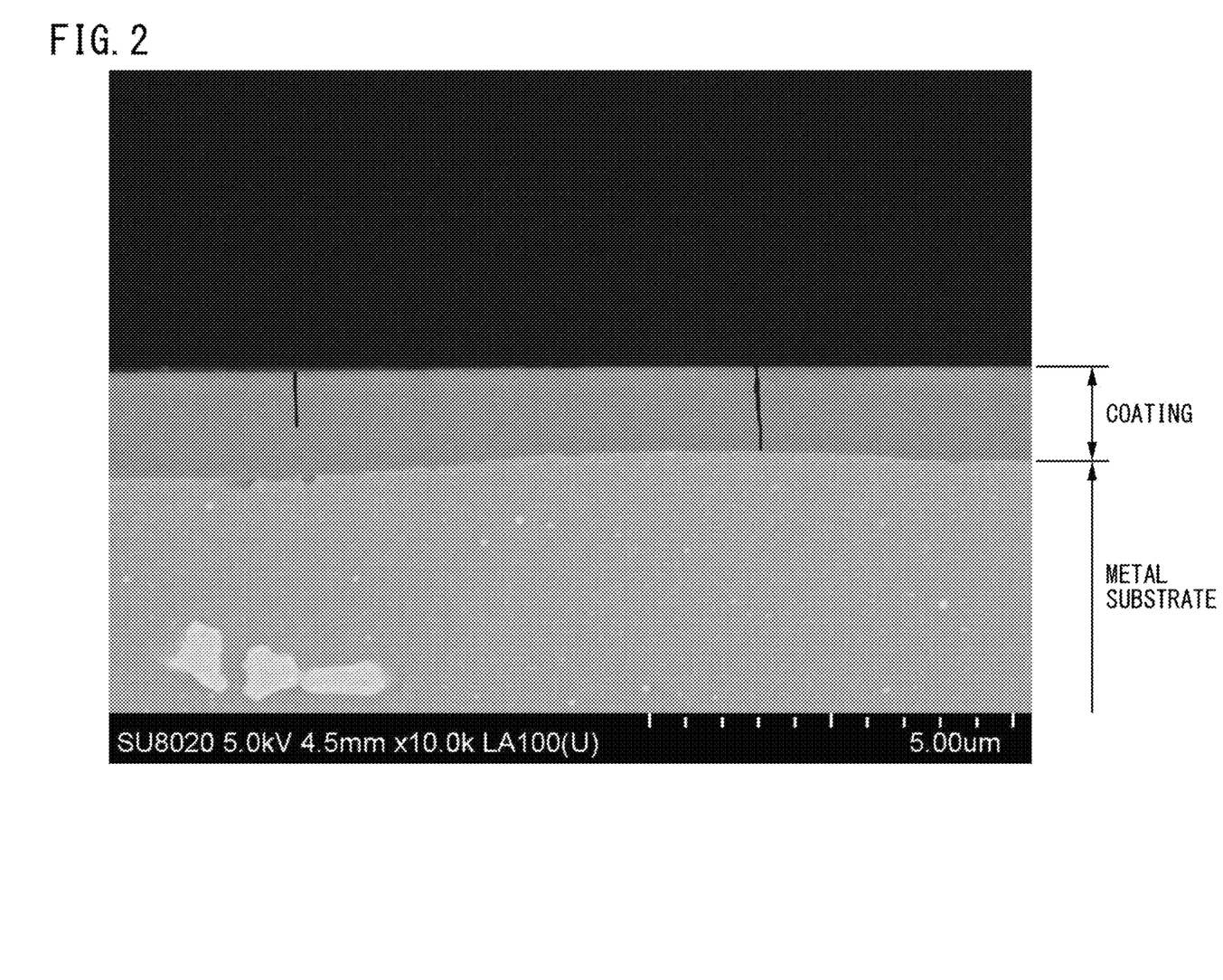
FIG. 2 is an electron micrograph of a cross section of the coating according to Comparative Example.

FIG. 2 is an electron micrograph of a cross section of the coating according to Comparative Example.

In Comparative Example, only the first coating was formed.

As shown in FIG. 2, it is found that there are a large number of cracks on the surface of the first coating.

Figure 3:
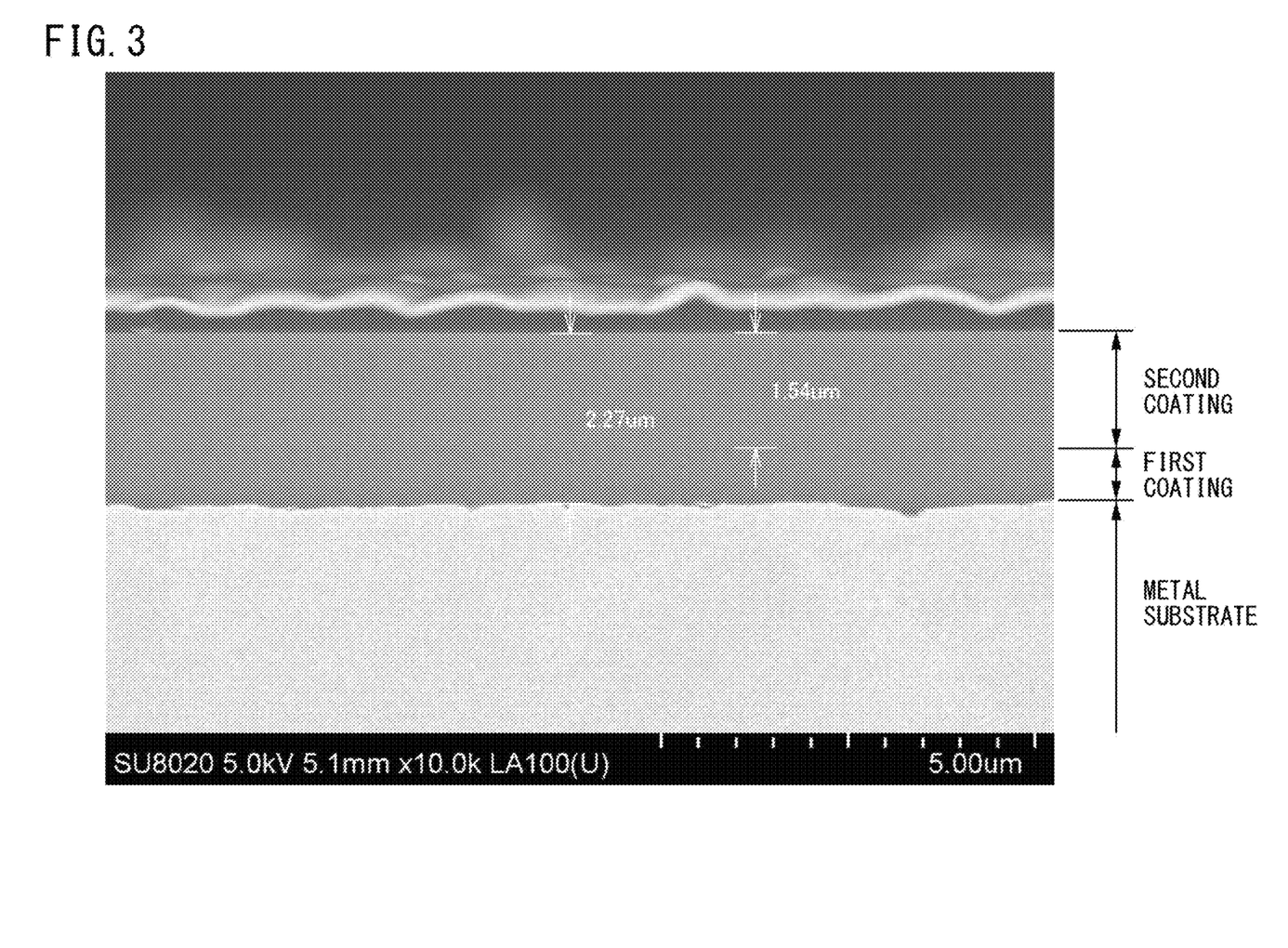
FIG. 3 is an electron micrograph of a cross section of the coating according to Example 1.
Figure 4:
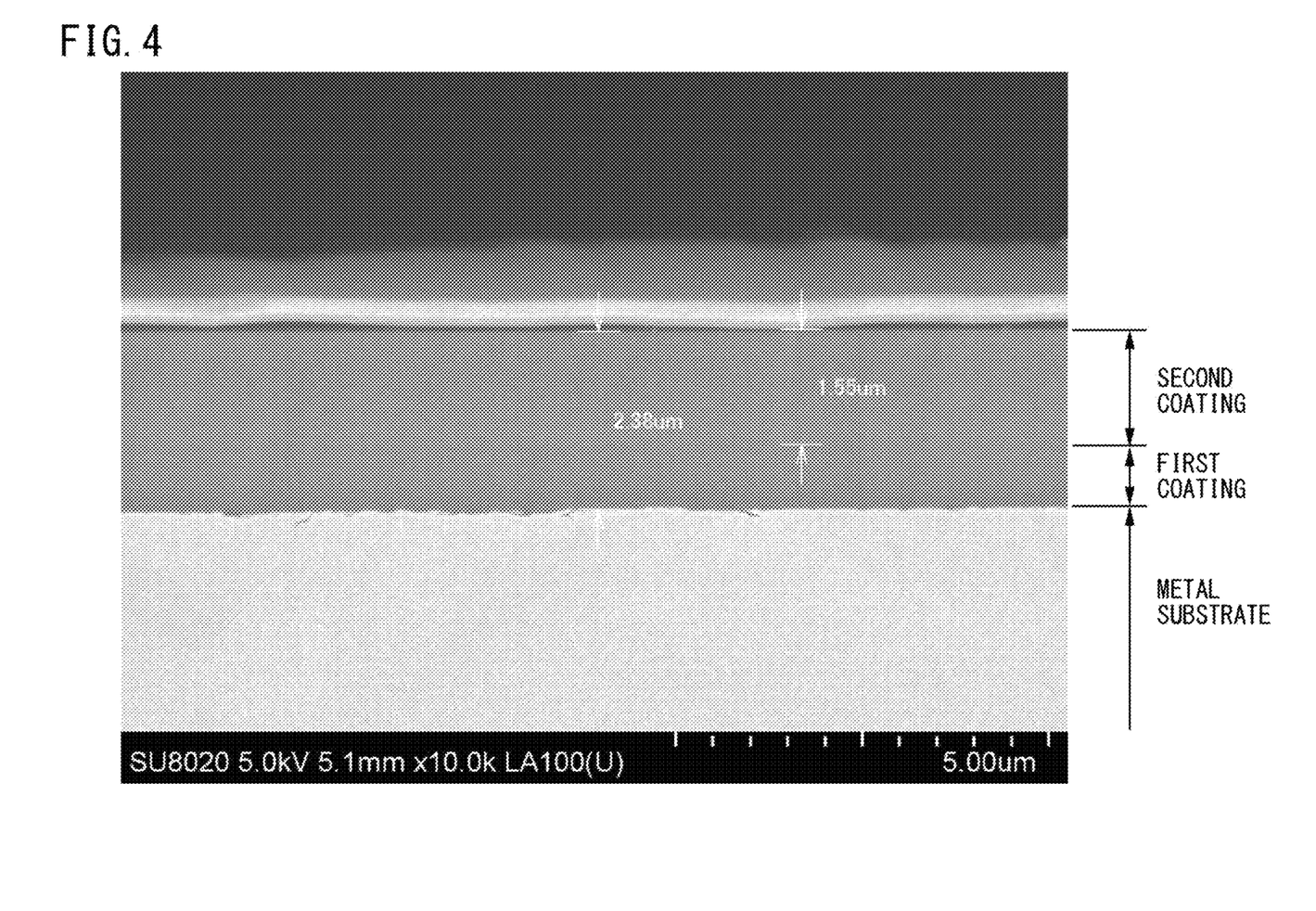
FIG. 4 is an electron micrograph of a cross section of the coating according to Example 2.
Figure 5:
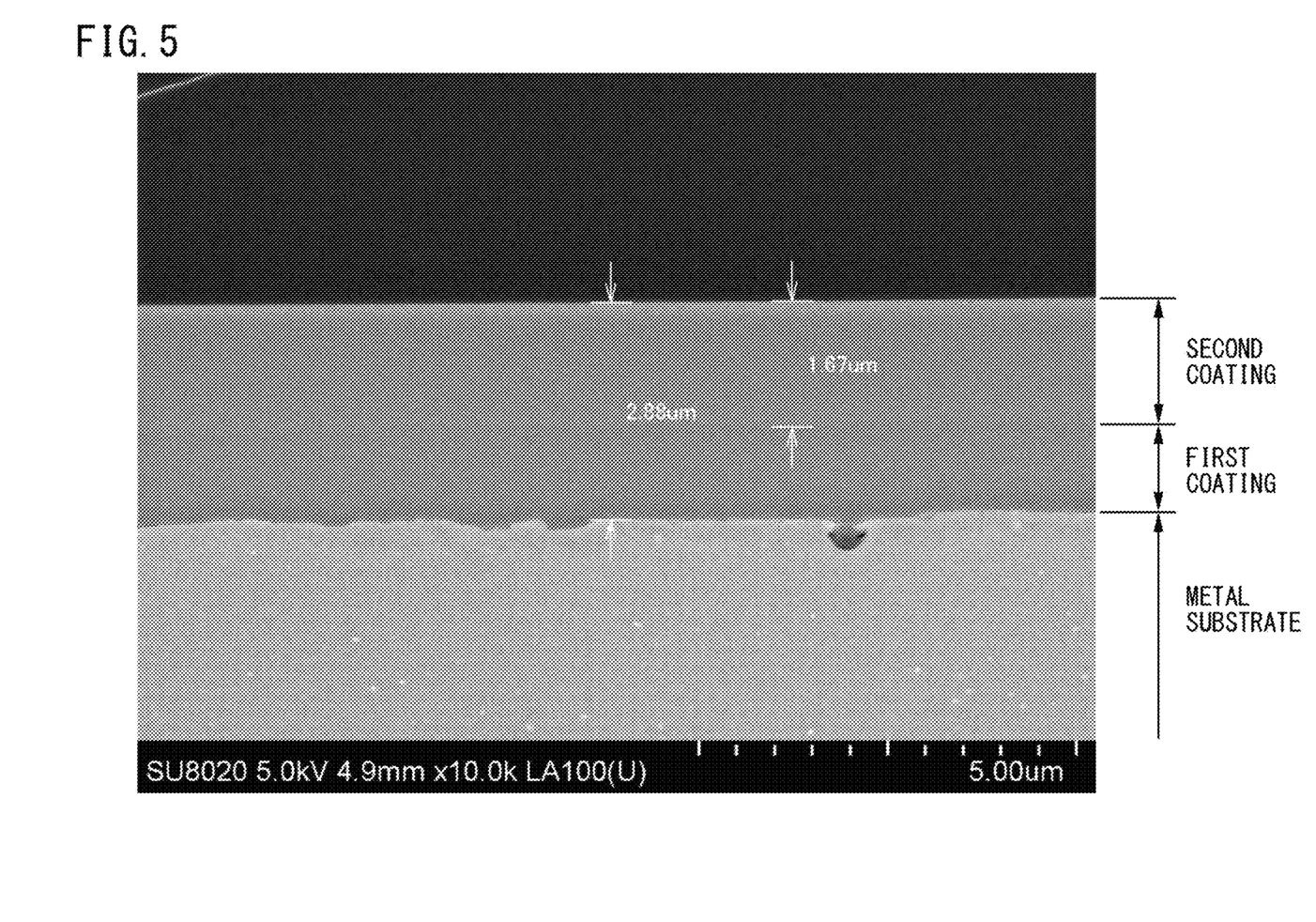
FIG. 5 is an electron micrograph of a cross section of the coating according to Example 3.

FIG. 3 is an electron micrograph of a cross section of the coating according to Example 1, FIG. 4 is an electron micrograph of a cross section of the coating according to Example 2, and FIG. 5 is an electron micrograph of a cross section of the coating according to Example 3.

As shown in FIGS. 3, 4 and 5, in Examples 1 to 3, it can be seen that there were generated no cracks which were found in Comparative Example.

As seen in Comparative Example, usually, cracks are generated in a silica-based coating obtained by converting a polysilazane into silica when the thickness of the coating exceeds 1.0 μm, but in Examples 1 to 3, cracks are not generated even when the total coating thickness exceeds 2.0 μm.

[Hydrochloric Acid Corrosion Resistance Test]

Each of the test pieces obtained in Examples 1, 2 and 3 and Comparative Example was masked such that only the surface on which the coating was formed was exposed, and each of the masked test pieces was immersed in a 10% hydrochloric acid solution at normal temperature for 24 hours, and the corrosion state of the surface on which the coating was formed was observed.

The results are shown in Table 1 below.

TABLE 1

| | Presence or absence of corrosion |
|---|---|
| Example 1 | Absent |
| Example 2 | Absent |
| Example 3 | Absent |
| Comparative Example | Present |

As shown in Table 1, corrosion was observed and partial peeling occurred in Comparative Example in which cracks were generated in the first coating, but corrosion was not observed in Examples 1 to 3.

This reveals that there are no cracks in the second coating and decrease in an anticorrosion effect caused by the cracks can be prevented.

In addition, it is found that the second coating has high corrosion resistance in a hydrochloric acid solution.

REFERENCE SIGNS LIST 1 first coating
1a surface
2 metal substrate
2a surface
3 second coating

The invention claimed is:

1. A method for forming a coating comprising:
a first step of applying a first solution comprising a polysilazane consisting of perhydropolysilazane to a surface of a metal substrate and heating the first solution at a first temperature to form a first coating on the surface of the metal substrate, and
a second step of applying a second solution comprising a polysilazane consisting of perhydropolysilazane to a surface of the first coating and heating the second solution at a second temperature lower than the first temperature to form a second coating on the surface of the first coating, wherein
a density of the first coating is less than 2.00 g/cm$^3$, and
a density of the second coating is 2.00 g/cm$^3$ or more.

2. The method for forming a coating according to claim 1, wherein
the second solution comprises at least one among an organic metal, a metal compound, and an amine compound.

3. The method for forming a coating according to claim 1, wherein
a thickness of the first coating and a thickness of the second coating are each 0.01 μm or more and 10.0 μm or less.

4. The method for forming a coating according to claim 1, wherein
in the first step, the first coating is formed by repeating a prescribed number of times the step of applying the first solution to the metal substrate and the step of heating the first solution.

5. The method for forming a coating according to claim 1, wherein
in the second step, the second coating is formed by repeating a prescribed number of times the step of applying the second solution to the first coating and the step of heating the second solution.

* * * * *